United States Patent Office 3,353,947
Patented Nov. 21, 1967

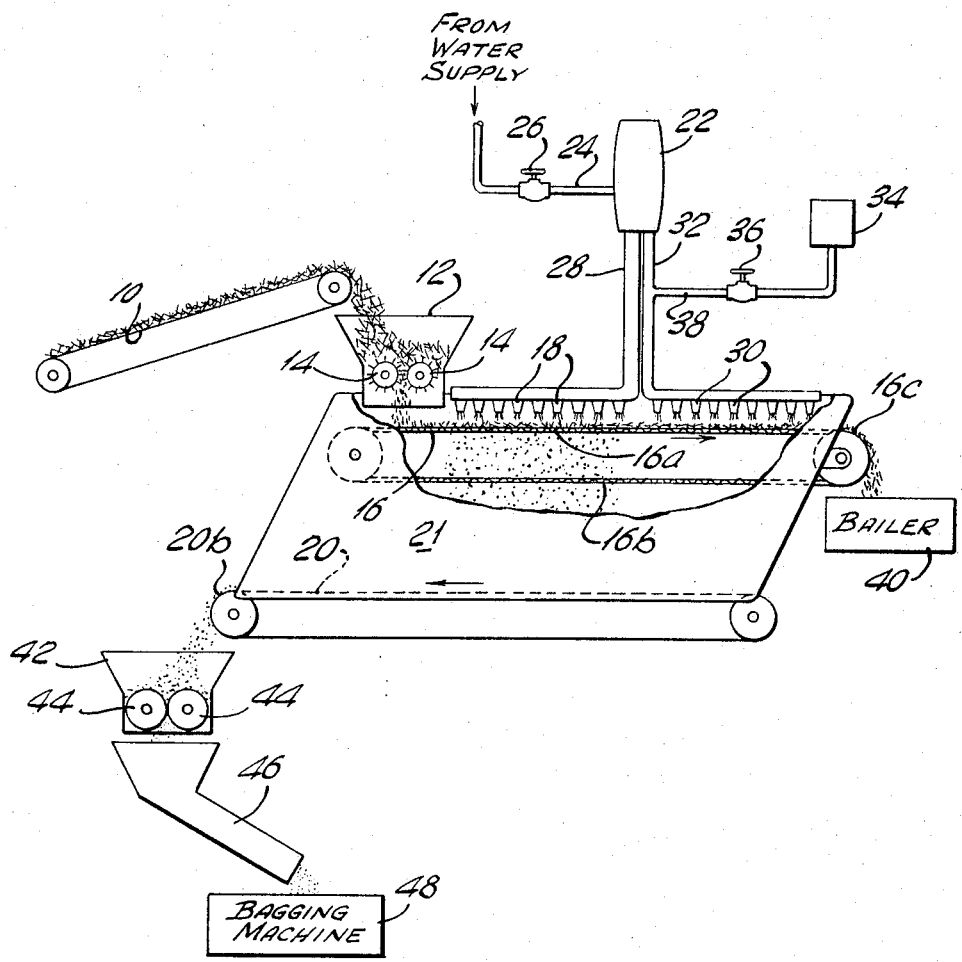

3,353,947
METHOD AND APPARATUS FOR THE SEPARATION OF STRAW AND MANURE
Friedrich S. Kramer, 60—01 C 194th St.,
Fresh Meadows, N.Y. 11365
Filed Apr. 29, 1964, Ser. No. 363,476
11 Claims. (Cl. 71—21)

ABSTRACT OF THE DISCLOSURE

A method and apparatus for separating the straw floor covering of animal shelters from the animal waste deposited thereon. The mixture is shredded and deposited upon a conveyor screen where it is subjected to a hot air and steam blast. The waste is thereby separated from the straw, forced through the screen and dried. The straw is carried on where it is dried, disinfected and bailed.

This invention relates to the treatment of an organic fertilizer mass and more particularly to a method and apparatus for separating the fertilizer from straw with which it is intermixed and for cleaning the straw to make it suitable for future use.

At various racetracks in urban areas throughout the country there is a problem in disposing of the manure that is produced daily by the horses. This fertilizer is mixed with large amounts of straw to form a composite mass which must be carried away. The amounts involved are substantial at the larger racetracks where many tons of the composite mass must be disposed of daily during the peak of the racing season. In urban centers of substantial size the problem of disposal is particularly acute, since it may be necessary to transport the fertilizer for many miles to an acceptable dumping location. Such an operation can represent considerable expense in labor and equipment. Moreover, in non-urban areas where the problem of a nearby acceptable dumping area does not exist, the organic fertilizer is not readily marketable as a fertilizer, since it is intermixed with a relatively large amount of straw.

Accordingly, it is an object of this invention to provide a method and apparatus for disposing of a composite mass such as organic fertilizer and straw or hay, in an economical manner.

Another object of the invention is to make available a method and apparatus for separating organic fertilizer from vegetation in elongated form with which it is intermixed.

A further object of the invention is to obtain a relatively pure fertilizer from a composite mass comprising said fertilizer and straw.

A still further object is to recondition the elongated straw ingredient of the fertilizer composite to make it suitable for further use.

Yet another object is to reduce the cost of providing suitable bedding material in elongated form for horses.

Another object is to eliminate the transportation cost of disposing of the composite fertilizer mass referred to and to substitute therefor a method and apparatus which can be employed to utilize the ingredients of the composite mass in a profitable manner.

All of the objects, features and advantages of this invention and the manner of attaining them will become more apparent and the invention itself will be best understood by reference to the following description of an embodiment of the invention taken in conjunction with the accompanying drawing.

In accordance with an aspect of the invention, a composite mass of organic fertilizer and straw is fed to suitable apparatus where the fertilizer is separated from the longer strands of straw and these separated ingredients are then further treated. Thus, there is provided a shredder for shredding the composite mass to reduce the size of individual fertilizer pieces and to loosen the straw from the fertilizer. A conveyor is provided beneath the shredder for receiving the ingredients therefrom. As the mass of loosened ingredients progresses on the conveyor, a blast of hot air and steam is employed to force the fertilizer through apertures in the conveyor so that it is deposited on a second conveyor beneath the first conveyor. The fertilizer thus deposited will contain short lengths of straw and this product is moved along by the second conveyor and preferably fed to a grinder where it is ground to small size and thereafter fed by suitable means either to a storage location or to a bagging machine. The strands of straw which are too long to pass through the aperture in the first conveyor continue along on this conveyor to pass a location where they are disinfected by a suitable spray. The disinfected straw then continues along the first conveyor to the end thereof where it is delivered for storage or to be bound by a suitable baling machine.

Referring now to the drawing, a conveyor belt 10 is provided for delivering a composite mass consisting of manure and straw to a hopper 12. At the bottom of the hopper there is provided suitable shredding means which may be in the form of rotatable wheels 14 for breaking up the lumps or pieces of the composite mass and loosening the straw therefrom. This product is dropped onto a conveyor in the form of a screen belt 16. As the product is moved along by the conveyor belt 16 from the output of the shredder hopper 12, it is brought beneath a series of nozzles 18.

The nozzles 18 deliver a relatively high velocity blast of hot air and steam against the product on the screen belt 16. This blast forces the manure through the upper and lower sections 16a and 16b respectively, of the screen belt 16, thereby separating it from the longer strands of straw which are incapable of passing through the screen belt apertures. The manure is driven through the screen belt 16 with short pieces of straw and this product is deposited on another conveyor belt 20 to be further treated as will appear. Suitable guard means in the form of panels 21 are provided on opposite sides of the upper conveyor 16 and extend down to the lower conveyor 20 to confine the manure and assure that it will be deposited on the lower conveyor.

The high velocity blast of hot air and steam which forces the manure through the screen belt 16 may be obtained in a number of ways. In accordance with the invention, however, it is preferable to employ a small jet engine 22 for this purpose, since the exhaust gases are very hot and a suitable air flow of the proper temperature can easily be obtained in a compact unit at reasonable expense. In order to provide superheated steam from the jets 18, water injection is employed to feed a suitable amount of water into the jet engine 22 by means of a pipe 24 and valve 26. Steam could also be generated by feeding the water into the jet engine exhaust conduit 28, if desired. It should also be pointed out that the invention can be practised with a dry air blast from the nozzles 18, however the use of steam with the air is preferable. The use of a jet engine to provide the air-steam blast allows substantial economy of expense over the cost of employing conventional equipment to heat the air and compress it, and to develop steam.

The longer straw strands which are not blown through the conveyor screen belt 16 continue on the conveyor past the nozzles 18 and are eventually carried beneath a series of disinfecting nozzles 30. These latter nozzles deliver a suitable disinfectant, such as for example, an aqueous solution of chlorine, under pressure, for treatment of the straw. The pressure necessary for proper disinfecting may also be derived from the exhaust of the jet engine 22 by means of another exhaust conduit 32. The chlorine may be fed from a tank 34 and controlled by a valve 36 to enter the conduit 32 at a desired rate through a chlorine feed pipe 38. Alternatively, a single conduit may replace the conduits 28 and 32, however, separate conduits are preferable.

After being disinfected under the spray nozzles 30, the long strands of straw are carried to the end 16c of the screen belt 16 and delivered to a suitable baling machine 40 for automatically baling the same.

Referring again to the lower conveyor belt 20, the product comprising manure and short straw strands deposited thereon is carried to the end 20b thereof and deposited into a hopper 42. Suitable grinding wheels 44 are provided at the bottom of the hopper 42 for grinding the manure and short straw strands into small particle form. The ground product is then fed into a chute 46 which carries it to a conventional bagging machine 48 for individually bagging the ground mixture.

It will be appreciated that the fertilizer product which is forced through the screen belt 16 to the lower conveyor belt 20 is dried by the hot air and steam from the nozzles 18. Accordingly, it is biologically stable, i.e., incapable of further fermentation and bacteriologically clean because it is dehydrated. The longer strands of straw which are carried by the screen belt 16 to the baling machine 40 are cleaned by the hot air and steam blast from the nozzles 18, are dehydrated because the steam is superheated, and are disinfected by the chlorine nozzles 30. This straw is thus reconditioned so that it is suitable for reuse as bedding material for the horses.

It will be appreciated that this invention has a number of important advantages. Thus, disposing of the composite mass of manure and straw, which heretofore had limited usefulness due to the high straw content, is no longer a problem, nor is there any disposal expense involved as such. Instead of disposing of the composite mass, the ingredients thereof are separated from one another and treated in such a manner that each is now an independently marketable product. The finely ground and bagged manure is readily marketable, even in urban areas and the straw can be sold for use again as stall bedding material or for other applications.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. Apparatus for receiving a composite mass of manure and straw to separate said manure from said straw and to treat the separated ingredients comprising
   shredding means at a given location for reducing the size of relatively large pieces of said composite and for loosening said ingredients from one another,
   a first movable conveyor for receiving the composite mass from said shredding means, said first conveyor comprising a screen-type belt,
   a second movable conveyor located generally beneath said first conveyor,
   first means at a first location above said first conveyor for blowing hot air and steam downwardly to separate said manure from the longer strands of said straw and to force said manure through said screen belt and onto said second conveyor, said longer strands of said straw being retained on said screen-type belt,
   second means above said first conveyor at a second location along said first conveyor for disinfecting said longer strands of straw,
   and third means for providing a substantial volume of relatively high velocity air to said first means, said third means also providing air pressure to said second means.

2. The invention described in claim 1 wherein said third means comprises a jet engine.

3. The invention described in claim 2 which further includes means for providing super-heated steam to said first means to clean and dehydrate said straw.

4. The invention described in claim 3 wherein said means for providing super-heated steam comprises means for injecting water into said jet engine.

5. The invention described in claim 1 which further includes means for introducing chlorine into said second means whereby said straw is disinfected.

6. The invention described in claim 1 which further includes means for delivering the manure and straw composite to said shredding means.

7. The invention described in claim 1 which further includes means at one end of said second conveyor for receiving manure and short strands of straw from said second conveyor and grinding the same to a smaller size.

8. The invention described in claim 1 which further includes means at one end of said first conveyor for receiving said straw therefrom, and a machine for baling the same.

9. A method for separating the ingredients of a composite mass including manure and straw which comprises the steps of
   reducing the size of relatively large pieces of said composite and loosening said straw from said manure,
   separating said manure from the longer strands of straw by means of a blast of moist hot air,
   disinfecting said longer strands of straw,
   collecting said manure,
   and collecting said longer strands of straw.

10. A method for separating the ingredients of a composite mass including manure and straw which comprises the steps of
    manipulating said composite mass in a shredding means to reduce the size of relatively large pieces of said composite and to loosen said ingredients from one another,
    transferring the composite mass from said shredding means to a first movable conveyor in the form of a screen-type belt,
    moving said first conveyor to cause said loosened composite mass to pass beneath a blast of hot air and steam to separate said manure from the longer strands of said straw, whereby said manure is forced through said screen and deposited on a second conveyor beneath said first conveyor and said longer strands of straw remain on said first conveyor,
    collecting said manure from said second conveyor,
    continuing the movement of said first conveyor to cause said longer strands of straw to pass beneath a disinfecting spray,
    and collecting said longer strands of straw from said first conveyor.

11. A method for separating the ingredients of a composite mass including manure and straw which comprises the steps of
    reducing the size of relatively large pieces of said composite and loosening said straw from said manure,
    and separating said manure from the longer strands of straw by means of a blast of hot air and steam.

References Cited

UNITED STATES PATENTS

| | | | |
|---|---|---|---|
| 1,593,491 | 7/1926 | Gerson | 71—14 |
| 2,129,214 | 9/1938 | Hopkins | 209—321 |

DONALL H. SYLVESTER, *Primary Examiner.*

T. D. KILEY, *Assistant Examiner.*